United States Patent
Kusumoto et al.

(10) Patent No.: US 7,099,919 B2
(45) Date of Patent: Aug. 29, 2006

(54) INFORMATION SHARING METHOD AND APPARATUS USING OBJECT ORIENTED TECHNOLOGY

(75) Inventors: Koji Kusumoto, San Jose, CA (US); Kazushige Oikawa, San Jose, CA (US)

(73) Assignee: K-Plex Inc., San Jose, CA (US)

( * ) Notice: Subject to any disclaimer, the term of this patent is extended or adjusted under 35 U.S.C. 154(b) by 775 days.

(21) Appl. No.: 10/143,749

(22) Filed: May 14, 2002

(65) Prior Publication Data

US 2002/0180777 A1 Dec. 5, 2002

(30) Foreign Application Priority Data

May 14, 2001 (JP) ............................... 2001-143136

(51) Int. Cl.
*G06F 13/00* (2006.01)
(52) U.S. Cl. ...................... 709/205; 709/213; 709/219; 719/329
(58) Field of Classification Search ................ 709/202, 709/203, 204, 205, 217, 219, 213; 719/328, 719/329
See application file for complete search history.

(56) References Cited

U.S. PATENT DOCUMENTS

| | | | |
|---|---|---|---|
| 5,717,879 A | | 2/1998 | Moran et al. |
| 5,758,083 A | * | 5/1998 | Singh et al. ................. 709/223 |
| 6,230,171 B1 | * | 5/2001 | Pacifici et al. .............. 715/512 |
| 6,629,129 B1 | * | 9/2003 | Bookspan et al. .......... 709/204 |
| 6,851,115 B1 | * | 2/2005 | Cheyer et al. .............. 719/317 |
| 7,024,456 B1 | * | 4/2006 | Simonoff ..................... 709/205 |
| 2002/0040314 A1 | * | 4/2002 | Tolson .......................... 705/10 |
| 2002/0138624 A1 | * | 9/2002 | Esenther ...................... 709/227 |

FOREIGN PATENT DOCUMENTS

| | | |
|---|---|---|
| EP | 0 784 263 A1 | 7/1997 |
| WO | WO98/21671 A1 | 5/1998 |

OTHER PUBLICATIONS

Gutwin, C. and Greenberg, S., "Support for group awareness in real-time desktop conferences," Department of Computer Science, University of Calgary, Canada; Computer Science Department Technical Report, New York, NY, Mar. 1, 1995, pp. 1-12 (XP002029607).

* cited by examiner

*Primary Examiner*—Viet Vu
(74) *Attorney, Agent, or Firm*—Birch, Stewart, Kolasch & Birch, LLP

(57) ABSTRACT

An information sharing method and apparatus using an object oriented technology are provided for mutually sharing any manipulation events in a shared environment which operates in a plurality of computers on a network. The method provides a plurality of objects to be used by users for information processing on their information processing apparatuses, and an environment in which the objects operate. Each of the objects transmits an event made thereto by an operator as a message. A shared field object is shared by a plurality of users, and one or more objects operate on the shared field object. These objects are distributed to the plurality of users to share the same environment among the users. A message of the event is distributed to each of the users through the shared field object to recall the event in the respective environments to share the operation of the object.

11 Claims, 12 Drawing Sheets

INFORMATION SHARING METHOD AND APPARATUS USING OBJECT ORIENTED TECHNOLOGY

BACKGROUND OF THE INVENTION

The present invention relates to a technology for allowing a plurality of computers connected to a network to share information among them, and more particularly, to an information sharing technology for a plurality of computers interconnected through a network to collaborate in a GUI (Graphical User Interface) environment.

Conventionally, collaboration by a plurality of computers on a network using a GUI environment is often implemented on a one-to-one basis, wherein a screen displayed on a first computer is also displayed on a screen of a second computer such that the two computers have a common view for observation and an input to the second computer through a keyboard or a mouse associated therewith is also sent to the first computer as an input thereto, thereby mutually sharing the same work environment. In the work environment shared by a plurality of computers, a common environment is set in a single server, which plays the role of the first computer, and a plurality of computers connected to the server play the role of the second computer. The conventional configuration as described above involves a lot of types and amount of data mutually communicated between computers, resulting in an increased burden on the network and a failure in improving the throughput on a low speed network. The conventional configuration is therefore unsatisfactory. In addition, since sharing is implemented after all by resources of one computer, its efficiency depends on the performance of the computer. Furthermore, the conventional configuration experiences difficulties in ensuring the security of data and therefore has a problem that resources other than authorized ones could be misappropriated. Also, sharing often extends entirely and thus fails to separately establish a shared environment and individual environments inherent to respective computers which participate in the sharing in a compatible manner.

As a means for solving the foregoing problems, an object oriented environment has been devised. Object oriented basic software, designed and developed by Professor Yuzuru Tanaka of the Graduate School of Engineering at Hokkaido University, has partially realized such an environment using a so-called "intelligent pad" (abbreviated as IP) which is capable of visual programming to associate objects with one another.

IP develops software through synthesis, decomposition, reuse of parts having functions called "pads" and also implements an operating environment for developed pads. A "pad" is a type of object which is comprised of a model part having a structure called a slot for holding the state of the pad itself, and a view part for exchanging a message with the model part, and behaves as a basic unit which encapsulates inherent data and method. Respective pads are configured to use the slot as a common interface among other pads so that they can mutually exchange data and messages. In a GUI environment, the pads may be pasted together or peeled off to visually manipulate synthesis and decomposition. Details of IP is published in a variety of documents and Intelligent Pad Consortium (IPC: Intelligent Pad Consortium at http://www.pads.or.jp/).

The home page of the IPC publicly shows the result of "Shared Space Piazza Developing Project." This project realizes a shared field for intellectual properties distribution using the IP, wherein pads of the shared field are managed by a Piazza server through the Internet. The Piazza server keeps track of which pad has been pasted on the shared field pad, and the result of pasting or peeling by a user can be viewed by the other users who utilize the same shared field pad in completely the same state. Specifically, each time an event occurs on the shared field in which another pad is pasted or a pasted pad is peeled off, an event operator uploads the pad, which has been changed, to the server, while the other sharers download the changed pad from the server. These operations are repeated to allow a plurality of users to share objects which exist on the shared field. This does not constitute sharing of pad manipulation process but implements a function for users to paste pads that they desired to distribute to the shared field pad and mutually communicate among them.

In "Implementation of Collaborative Work Field in Synthetic Media System, Intelligent Pad," written by Hiroshi Nagasaki, Yuzuru Tanaka, et al. and printed in Collection of Information processing Society of Japan, Vol. 34, No. 05 (May 1993), and, "Synthetic Media Architecture and Its Perspective" written by Yuzuru Tanaka and printed in Journal of the Institute of Electrical Engineers of Japan, Vol. 113, No. 6, 1993, a shared work environment is implemented by sharing manipulation events performed on pads by users. Sharing of a user manipulation event involves pasting a pad on a field pad, and distributing a shared copy of the synthesized pad to each client. In other words, a model part and a view part exist separately on different sites. When a user's request for manipulation is detected in any of shared copies (view part), the state of a model part shared by these copies (view part) is updated, and its value is conveyed to all the copies (view part). Each of the shared copies (view part) accepts a manipulation request upon receiving update propagation. An object for communication is automatically inserted between the model part and the view part for communicating a message. Also, a field pad is provided with a function of reproducing a received manipulation request on its own region.

However, according to the above-mentioned conventional IP-based sharing system, not all manipulation events are shared. An event is shared only as a result of generating an object, pasting an object or deleting an object within a shared region, or when a model is updated and as a result, an operation that propagates the same is performed.

Manipulation events to be shared exist at various levels. For example, when a pad on a shared field pad is clicked to open a popup menu, display a menu and start a manipulation, there is no way of knowing which item has been selected from the menu unless the mouse event and menu display are shared.

Also, when sharing an event of moving a certain object and pasting it to another object (the pasting object is called a "child object" and the object to be pasted is called a "parent object"), if the child object is absorbed into the parent object immediately after the former has completed pasting, the child object looks as if it has disappeared from the original location. Thus, despite the series of operations of selecting, moving and pasting, if these manipulation events are not shared among the sharers, those that share the field are misled to think that the object has been deleted.

When, for example, building an electronic remote learning (eLearning) application by using a shared function, it is critical for a plurality of pupils to exactly understand movements of objects by observing manipulations by a teacher. Specifically, if the manipulation events are not shared among the pupils and the teacher as described above, even if the teacher sets a goal of learning to indicate an object on the screen by a series of operations, that is, selecting, moving and pasting, the pupils will regard the operations as simple deletion of the object, so that the learning effectiveness is compromised. Therefore, in the case of the aforementioned example, sharing such as the IP-based shared field as described above is not sufficient. Further, assuming that there are a plurality of sharers, it is necessary to take into consideration simultaneous mouse manipulations on the same object by sharers, midway participation in a shared region and midway retirement from the shared region.

SUMMARY OF THE INVENTION

The present invention is intended to solve the aforementioned problems using a visual object (abbreviated as "VO") as an improved object oriented environment for the IP.

The present invention provides a shared field (shared field VO) shared by a plurality of users. The users are given a right to access the shared field VO.

The present invention implements means which allows not only an operator but also the other sharing users to observe an entire action process including any events resulting from mouse manipulations, keyboard operations, etc. by a plurality of users, menu display and selection, contents of input through a keyboard, editing operation, locus of movement of a VO, pasting of VO onto another VO, peeling and updating operation that affects the other VOs, etc.

In a system of the present invention, a shared field VO is first set on an environment in which an VO system operates, and a group of VOs to be manipulated are registered on the shared field VO. The registered VOs respectively have position information relative to the shared field VO. Then, the shared field VO and the VOs registered thereon are promptly loaded onto clients of all users who share the shared field VO.

Each time an operator performs manipulation on a VO, information on each event for the VO is recorded by the shared field VO or the manipulated VO itself. The recorded event information is called the "VO scenario" and scenarios are managed according to VO.

VO scenarios include one for sharing a locus of VO movement indicative of sequentially recorded relative positions of a VO with respect to a shared field VO, one which proceeds along the time such as an event of a mouse or a keyboard, etc. The relative position is recorded at adjustable sampling time intervals.

Information on users who share the shared field VO and information on a server which has user information are held by the shared field VO, and it is decided based on the shared information where to deliver a VO scenario. An operation by an operator is distributed to all sharing users as a VO scenario upon execution.

The shared field VO on each client has a function of accepting and sending a VO scenario. A VO scenario delivered to the shared field VO of the sharing users is executed on the shared field VO on each client for each VO associated with the scenario. While individual sharers cannot manipulate an VO operating under management of such a scenario, they can manipulate an independent VO which is not operating under management of scenario. The independent VO in this context is, for example, a VO on the shared field VO except for a VO operating under management of the scenario or a VO placed in a parent-child relationship with the VO. It is also possible to reject a manipulation for pasting a VO on a VO operating under management of the scenario.

Thus, not only each sharing user can observe substantially simultaneously such results as a locus of VO movement by a manipulation of an operator, display of a menu on the VO, pasting and peeling of a VO, action to another VO, and so on, but also a plurality of sharers can collaboratively manipulate VOs on the shared field VO without simultaneously causing conflicts.

DETAILED DESCRIPTION OF THE INVENTION

In the following, an embodiment of the information sharing method and apparatus according to the present invention will be described with reference to the accompanying drawings.

Figure 1:
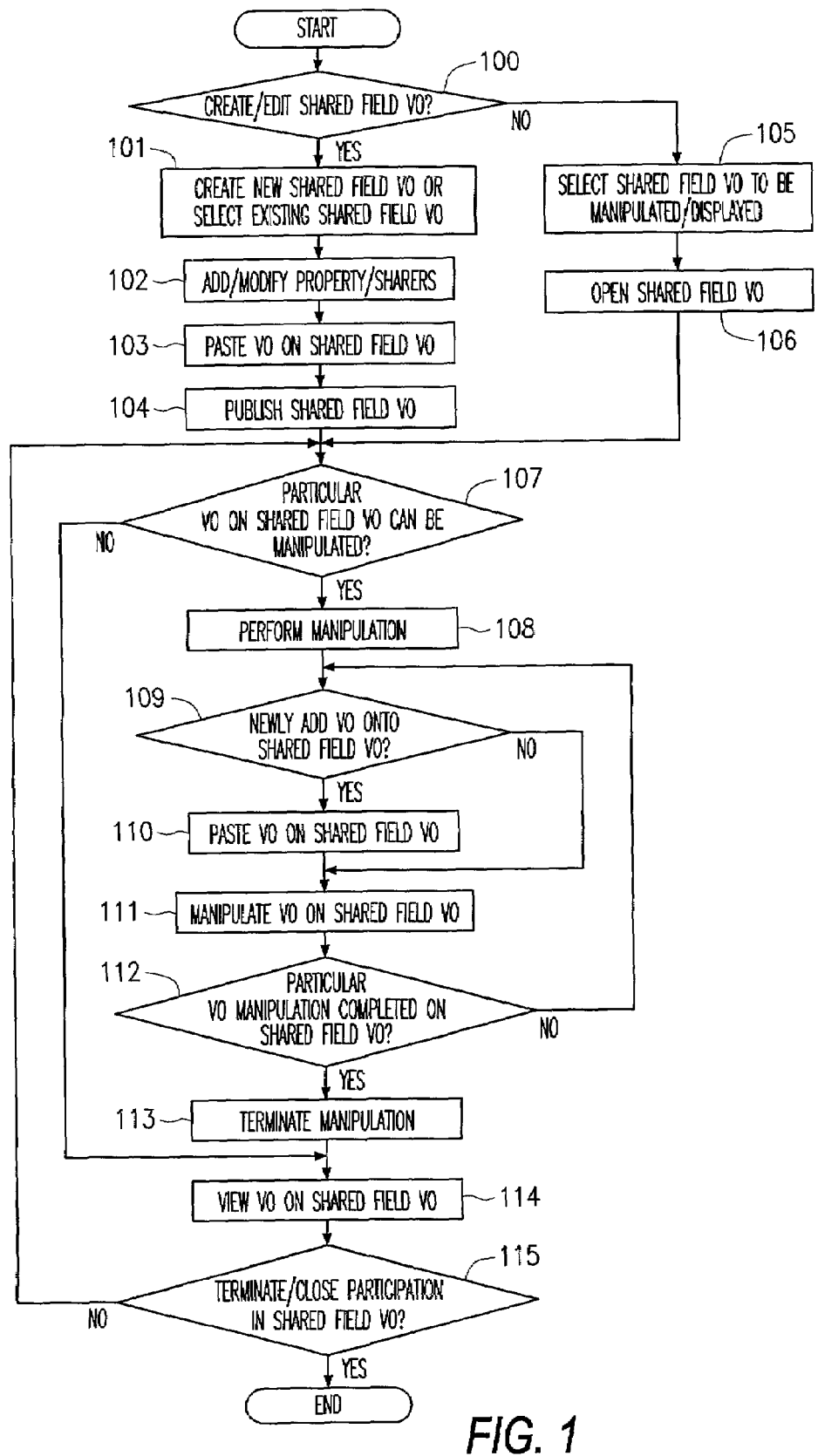
FIG. 1 is a flow chart illustrating an information sharing method according to the present invention.

FIG. 1 is a flow chart illustrating the information sharing method according to the present invention.

It is first determined whether a user simply wants to utilize a shared field VO, newly create/edit a shared field VO or edit an existing shared field VO (step 100). When the user wants to newly create/edit a shared field VO or edit an existing shared field VO, the user first creates a new shared field VO or selects editing of an existing shared field VO (step 101). In utilizing an existing shared field VO, the user invokes a shared field VO list, from which the user selects the existing shared field VO that (s)he desires to utilize. Listed shared field VOs are VOs in operation and VOs in non-operating status. Since VOs in operation are currently shared for operation, only VOs in non-operating status are available for the next operation.

Next, the user sets or modifies the name of the intended shared field VO and other properties (step 102). An essential item of the property items to be set is registration of names of the users that share the field with the user. In addition to a name of the creator of the shared field VO, names of the users who are authorized to access the shared field VO are registered. When the user selects an existing shared field VO, a list of sharers is displayed for the selected VO. If the list should be modified, name of a user is added or deleted as required.

Next, a VO or VOs to be shared in the initial state is/are pasted on the shared field VO (step 103), and the thus obtained shared field VO is published (step 104), which results in storage in a sharable region the names of the users who were authorized to access the shared field VO. The publication may be made in a shared field VO database region within the server or on a machine of each client. The shared field VO function can be implemented either through the server or by client machines alone (later described). Also, upon publication, the shared field VO enters the open state to operate. In other words, if even one of the sharers opens the shared field VO, the shared field VO is no longer in the non-operating state and enters the operating state.

For simply utilizing a shared field VO, the user may select a shared field VO that (s)he desires to use. (step 105). As a result, either the name of the shared field VO is listed or the VO is displayed in a closed state.

The selected shared field VO is opened (step 106). If the intended shared field VO is already being operated by another participant, the manipulation is regarded as a midway participation. When opened, the VO pasted on the shared field VO can be confirmed.

Here, if the user wants to perform a manipulation on an arbitrary VO on the shared field VO, the user confirms by clicking on the VO to select the same whether or not the user can manipulate the VO (step 107). If the VO is already being manipulated by one of the sharing users at that time, a display is made to that effect. Otherwise, if there is a scenario intended for the VO and the VO is in operation under management of the scenario, a subsequent manipulation event such as mouse-click is rejected (later described). In this way, it can be readily confirmed visually whether or not the user can manipulate the selected VO.

If the user cannot manipulate the selected VO, the user observes a manipulation being performed on the VO by another operator (step 114) and starts manipulating as soon as the other operator is finished (step 108).

In order to newly add a VO onto the shared field VO (step 109), a VO existing in a region not shared by any users may be pasted on the shared field VO or a VO may be newly created and pasted on the shared field VO (step 110). When the new VO is pasted on the shared field VO, a new menu indicating that the VO is a newly created one and the state of property setting after creation are displayed for the other sharers. Also, when a VO is pasted from a region not shared by users, the fact that an existing VO has been pasted on the shared field VO is promptly displayed for notification to the other sharers. Thus, it is designed such that the other sharers can keep track of the status.

The VO manipulations (step 111) on the shared field VO include, for example, display of a pop-up menu, menu selection and so on. The menu may provide such options as "move," "resize," "copy," "move to the first screen," "move to the last screen," "delete," and so on. When "move" is selected, the movement of a VO is executed. The coordinate position of the VO, which is being moved is sampled and delivered to each of the sharers, so that the locus of the VO is shared by all the sharers. Since sampling of size is also involved when "resize" is selected, its process is shared. When "copy" is selected, a copied VO appears on the shared field VO screen. "Move to the first screen" and "move to the last screen" are also performed instantaneously in the sharers' environments. For some VOs, other options may be effective, in which case the information about which menu an operator has selected is shared by the users. For example, for a VO provided with a menu including such options as "open property," "enter character string," and "enter numerical value," an event with respect to the VO is shared. Also, for slot coupling resulting from paste of a VO on another VO upon movement of the VO and a change in an internal state of VOs and a change in display of the VO due to update propagation, an operator's VO manipulation event, which causes such changes, propagates, and a similar event is issued to VOs on the published shared field VO. In this way, a change caused by an operator can be shared by the sharers as an operation in real time.

The foregoing operations are repeated until the manipulation on the shared field VO terminates (step 112), subsequently to which the manipulation on the shared field VO is terminated (step 113). As for an open shared field VO, a manipulation by other sharers can be shared by means of observation even if no particular VO is being manipulated (step 114). When it is desired to terminate participation in the shared field VO, the shared field VO is closed (step 115). If there is a participant in a shared field VO even after it is closed by a certain sharer (step 115), this manipulation is regarded as midway retirement.

Next, a system configuration of the information sharing apparatus according to the present invention will be described.

Figure 2:
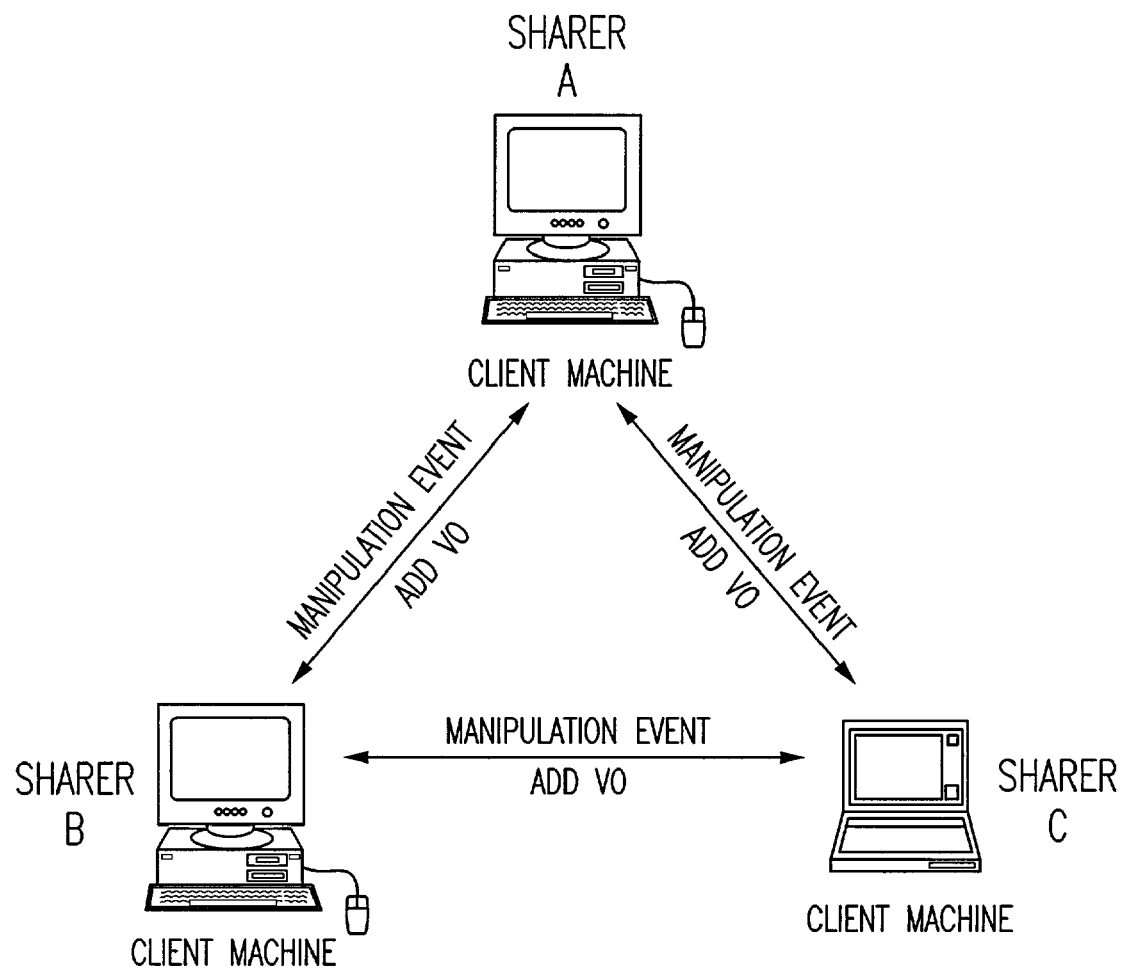
FIG. 2 is a diagram illustrating a first system configuration of an information sharing apparatus according to the present invention.

FIG. 2 illustrates a first system configuration of the information sharing apparatus according to the present invention. The illustrated system shows an exemplary configuration comprised only of client machines without intervention of a server machine or a database for implementing the present invention.

A shared field VO program is started on each client machine. The respective clients are on a par with one another. From a client machine which has initialized an operation on a shared field VO, the shared field VO and VOs pasted thereon are distributed to each client machine. Every time a user participates to share the field, the most recently updated shared field VO is transmitted from a client machine of the operator to a client machine of the new participant. All manipulation events of the operator are sequentially indicated to each client machine, such that associated VO manipulations are performed locally on each client machine.

Here, reference is made to the midway participation in and midway retirement from a shared field VO in accordance with the present invention. In case of the midway participation in a shared field VO, a participant loads the most recent shared field VO and receives an event currently under progress. This is because, in consideration of practical use, it seems natural that a midway participant acquires the most recent image of the shared field VO. In other words, for the midway participation, it is considered more important that a midway participant can have the same view as the other participants when (s)he participates in the shared field VO, although the appearance of the shared field VO may have changed since the participant retired last time.

When no server is provided as in the first system, the clients compare their time stamps to determine the most recent shared field VO. When a server is provided, a shared field VO on the server is the most recent.

In the present invention, a participant can retire from a shared field VO without affecting the other sharers. As of when the last sharer retires, the shared field VO enters the suspend mode.

Figure 3:
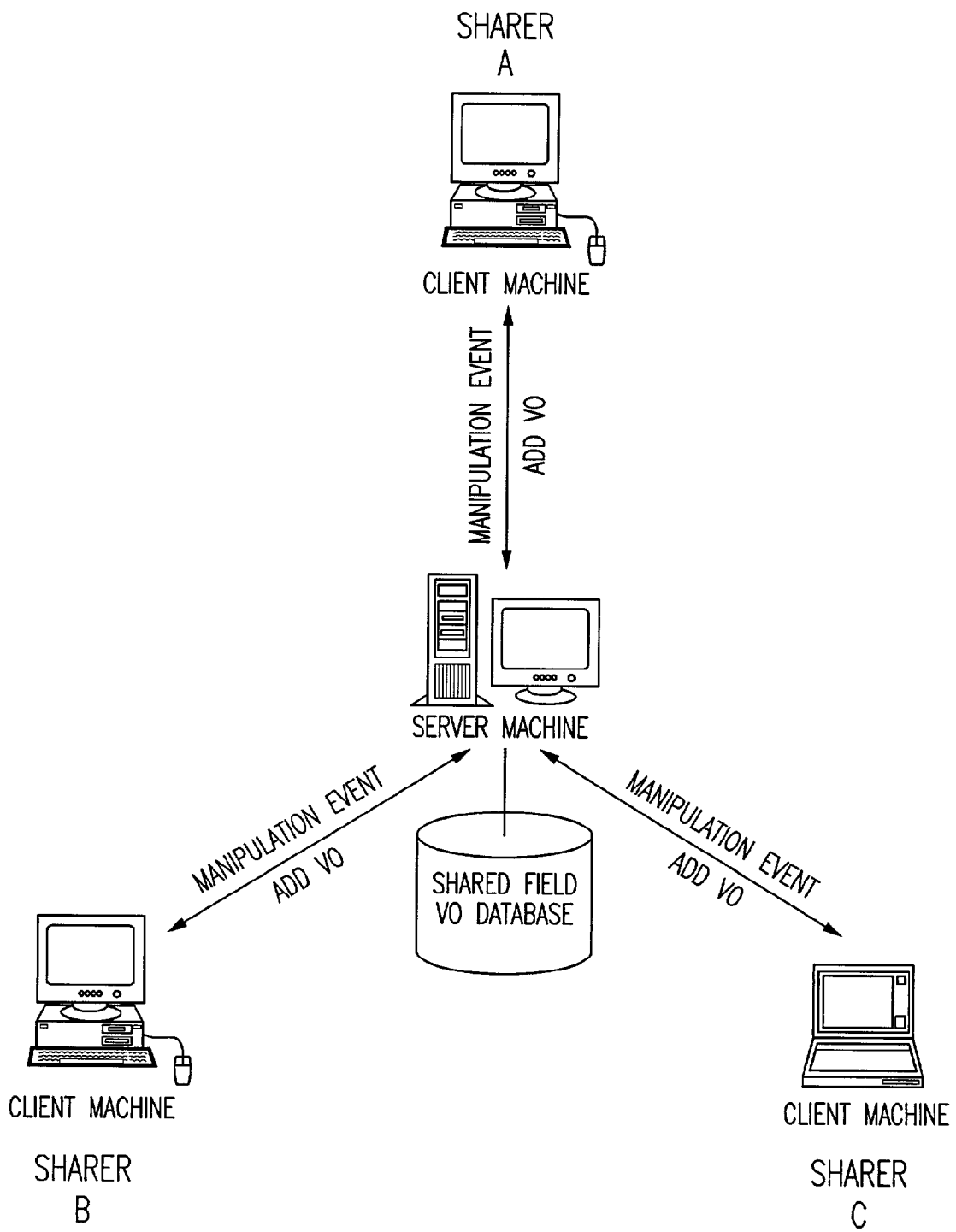
FIG. 3 is a diagram illustrating a second system configuration of the information sharing apparatus according to the present invention.

FIG. 3 illustrates a second system configuration of the information sharing apparatus according to the present invention.

The illustrated system shows an exemplary configuration where client machines communicate via a server machine and database to implement the present invention.

According to this configuration, clients communicate information through the server at all times. On the server, a service program is run for managing the state of a shared field VO, a list of sharers, and so on. A shared field VO program is run on each of the client machines. A shared field VO and VOs pasted thereon are placed on the server, and managed in the recently updated state. Each time a sharing user participates in the shared field VO, the shared field VO and VOs pasted thereon are distributed from the database on the server machine to a client machine of the sharing user who has newly participated in the shared field VO. All manipulation events on a VO by an operator are sequentially stored in the server. The server transfers these manipulation events to the client machines of the sharing users, such that the events are executed locally on each of the client machine.

Figure 4:
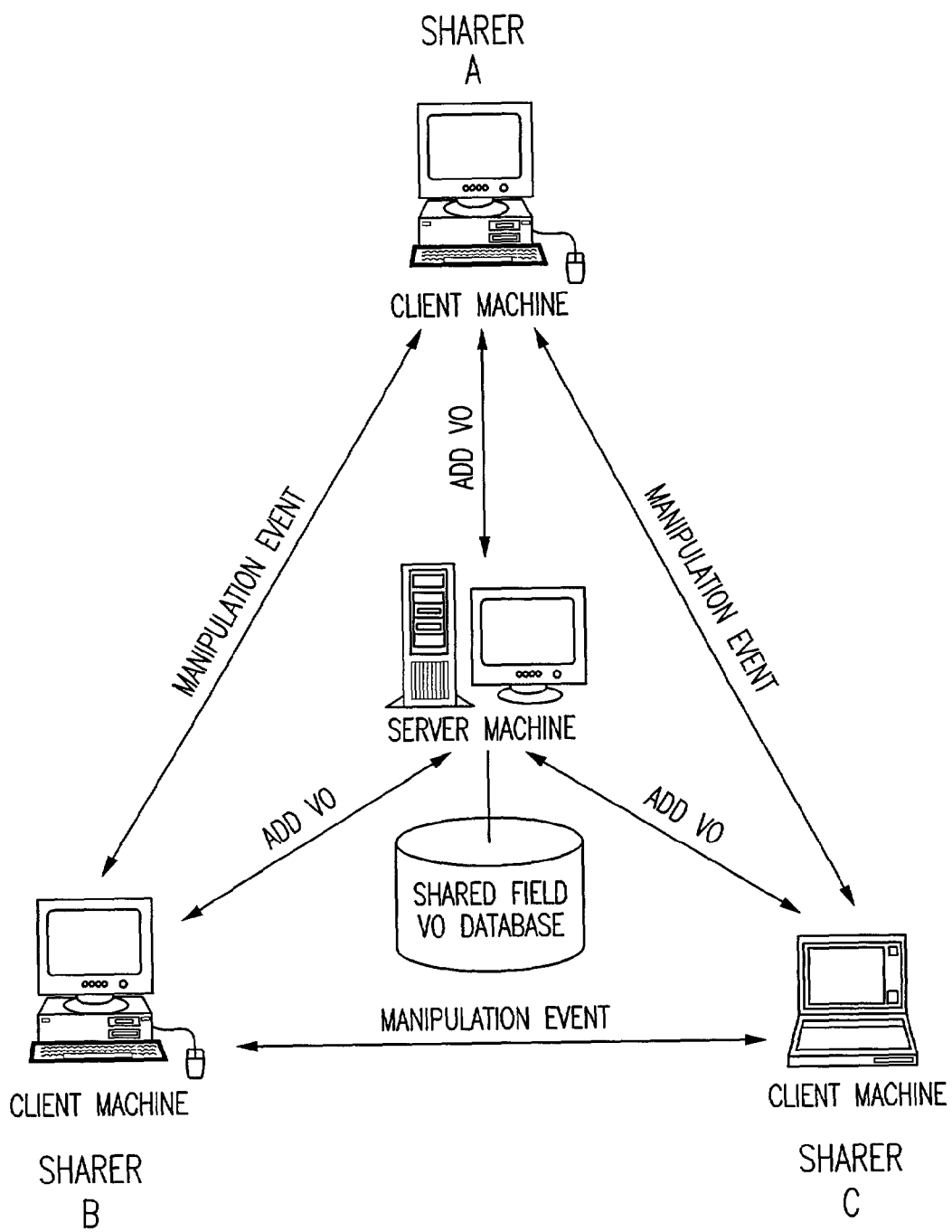
FIG. 4 is a diagram illustrating a third system configuration of the information sharing apparatus according to the present invention.

FIG. 4 illustrates a third system configuration of the information sharing apparatus according to the present invention.

Although FIG. 4 also shows an exemplary configuration where client machines communicate via a server machine and database to implement the present invention, unlike the exemplary system configuration in FIG. 3, information is communicated both between client machines and between the server and client machines in the system configuration shown in FIG. 4.

On the server, a service program is run for managing the state of a shared field VO, a list of sharers and so on. A shared field VO program is run on each client. The shared field VO and VOs pasted thereon are placed on the server, and managed in the recently updated state. Each time a sharing user participates in the shared field VO, the shared field VO and VOs pasted thereon are distributed from the database on the server machine to a client machine of the sharing user who has newly participated in the shared field VO. All manipulation events on a VO by an operator are directly sent to client machines of the sharers, and executed locally on each of the client machines.

Figure 5:
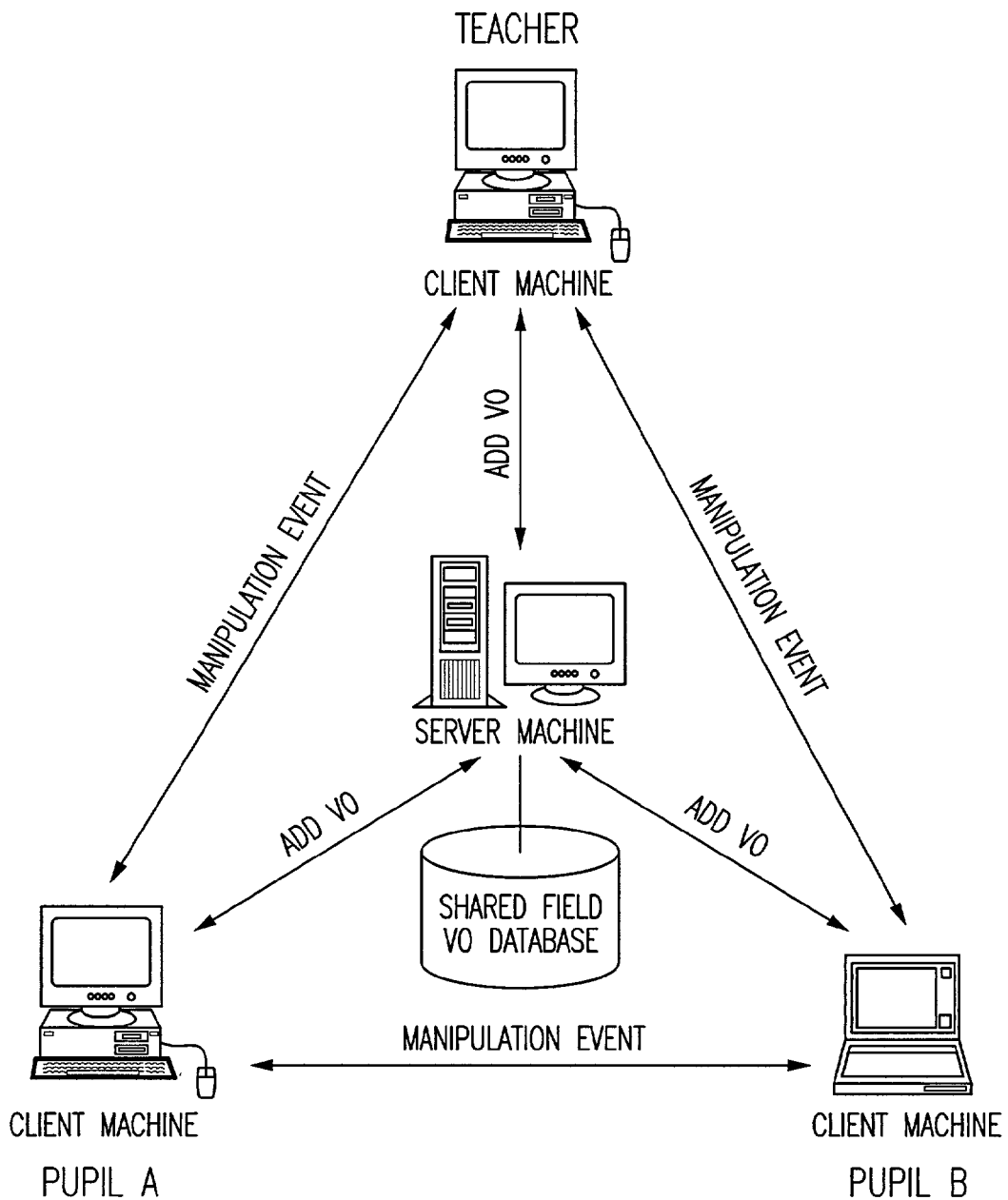
FIG. 5 is a diagram illustrating sharing of an application among a teacher, Pupil A and Pupil B in a system similar to that of FIG. 4.

Next, as an example of an application of the present information sharing apparatus, an application for list-displaying motion equation VOs of the displayed folder VOs, extracting one of them as a VO, providing the equation with a parameter and dropping the result thereof on a graph VO to display the results in the form of a graph and an example where the users share display and manipulation of a VO wrapping an application for presentation with a view to describe the motion equation and graph will be explained using the third system configuration by referring to FIGS. 5~7.

FIG. 5 illustrates a system, in which a shared field VO and VOs pasted thereon are shared via a server and a manipulation event by an operator is directly sent to clients, similarly to the system indicated in FIG. 4. It is assumed hereafter that one teacher and two pupils are conducting teaching and learning via the aforementioned shared field VO.

(1) The teacher newly creates a shared field VO. As a new VO creation button is depressed, a list of available VOs is displayed. A shared field VO is selected from the list. Upon selection, a VO of a predetermined size is generated. The generated VO is scaled to a size for an application to operate.

(2) Next, the teacher assigns a name to the created shared field VO for accessing (for example, "Study of Physics"), and registers the names of users who are allowed to share the shared field VO (for example, Pupil A and Pupil B). The above manipulation may be carried out, for example, by pointing the shared field VO with a mouse cursor, opening a dialog box by clicking on the right button of a mouse, and registering the user names therein. Here, if sharer candidates are registered in advance in the server, the names are listed via the server, so that the teacher may select users on the list with which the teacher desires to share the field VO.

(3) The teacher further pastes a motion equation VO folder VO and an equation graph VO on the shared field VO. This state is assumed to be a shared initial state.

(4) The teacher executes sharing. Shared field VOs are serialized and loaded on a shared field VO database on the server. All VOs existing on the shared field VO are also loaded on the shared VO database.

(5) The server has an interface which returns a list that enumerates the names of the shared field VOs and sharing users registered for the respective VOs, so that a sharing user can load the most recent shared field VO using this interface.

(6) Pupil A, who is a sharing user, can view a shared field VO, which (s)he can utilize on the desktop, as a "shared field VO name list." Pupil A selects a desired shared field VO from the name list, thereby loading the shared field VO from the server to open the same. This operation performed by Pupil A is interpreted as midway participation in the shared field VO.

Figure 6A:
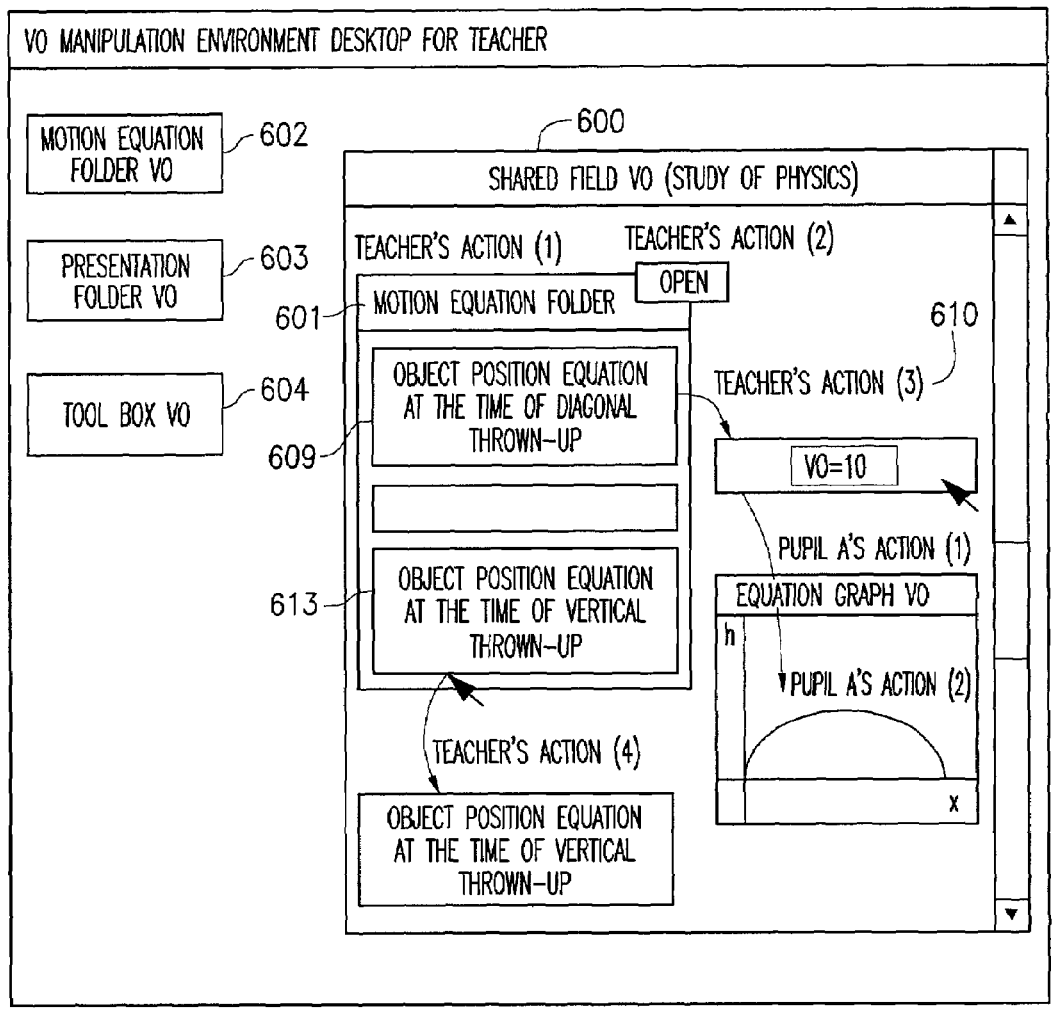
FIGS. 6 and 7 are diagrams showing how manipulations on VOs and locus of their movements are displayed to be shared on the information sharing apparatus according to the present invention.
Figure 6B:
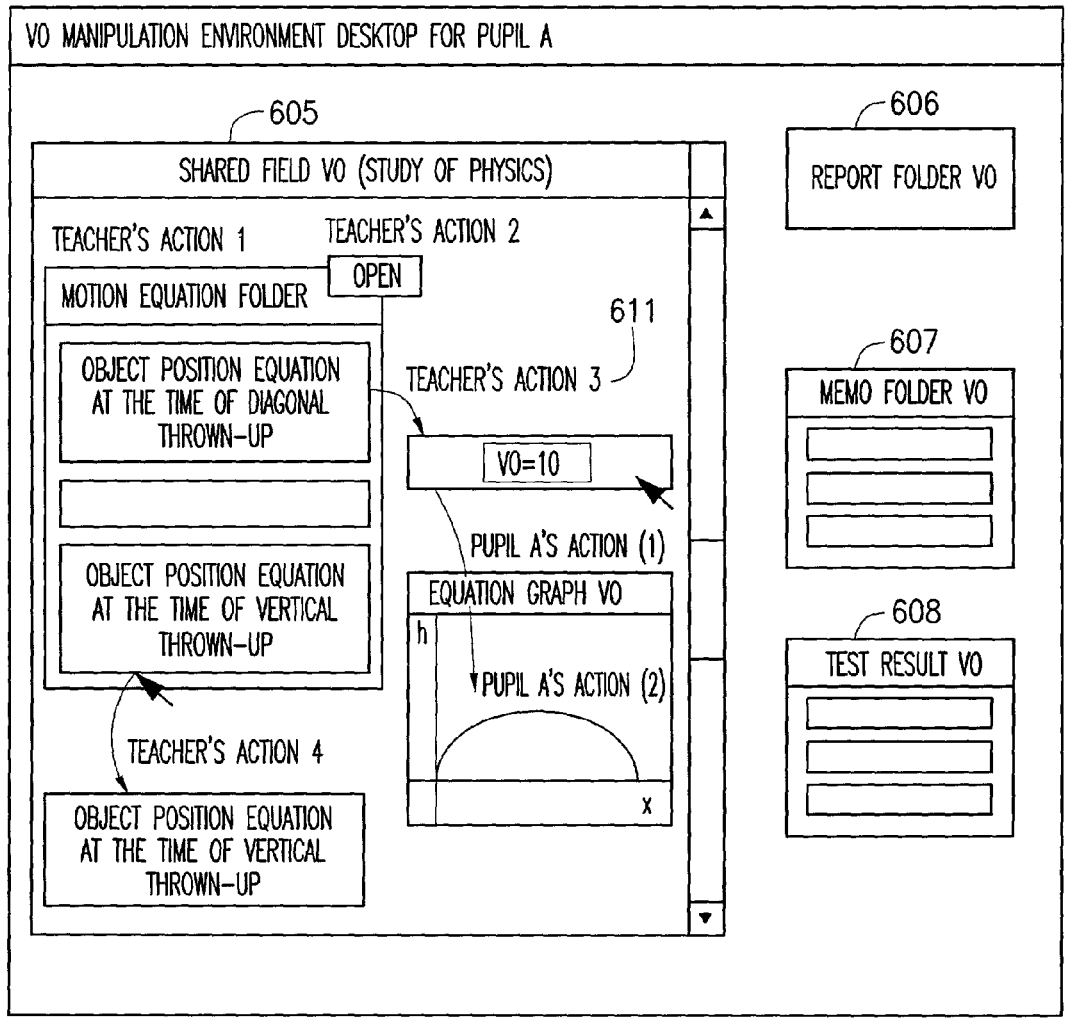

(7) From this point, sharing of a VO on the shared field VO by the teacher and Pupil A, who is a sharer, starts. FIG. 6A shows a display on a desktop screen of the teacher, on which a shared field VO (600) named "Study of Physics", which has been previously created, and a motion equation folder VO (601) pasted on the shared field VO are shown. "Motion equation folder VO" (602), "presentation folder VO" (603), "tool box VO" (604) and so on, which are not inside the shared field VO, are teacher's personal VOs, which are not shared by the other users and therefore invisible to them. FIG. 6B shows a display on a desktop screen of Pupil A, on which the shared field VO "Study of Physics" (605), in which Pupil A is participating, is shown in a manner similar to that on the desktop screen of the teacher. "Report folder VO" (606), "memo folder VO" (607), "test result VO" (608) and so on, which are not inside the shared field VO, are Pupil A's personal VOs, which are not shared by the other users and therefore invisible to them.

(8) As the teacher clicks on the motion equation folder VO (601) (teacher's manipulation 1) to display the right button menu, and selects "open" from the menu (teacher's manipulation 2). All these events are serialized and transmitted to the Pupil A's machine.

(9) The transmitted events are received by the Pupil A's shared field VO, which develops the serialized events and applies the manipulation events to the VOthereon. As a result, the same operation on the teacher's desktop is performed in real time on the Pupil A's desktop.

(10) The teacher selects "equation for calculating the position of an object when it is thrown upward diagonally" (609) which is one of equation VOs arranged in the motion equation folder VO (601), and drags it from the folder and drops it outside the folder (teacher's manipulation 3). In this event, the relative positions of the selected equation (609) from the shared field VO are sampled from when it is the folder till when it is dropped outside the folder, and a sequence of the operations are serialized and transmitted to Pupil A as an event.

(11) The Pupil A's shared field VO receives the event representative of the change in the relative position, and sequentially changes the coordinate position of the corresponding equation VO. Such transmission and execution of the event enables Pupil A to view the locus of the movement of VO associated with the drag and drop operation performed by the teacher in real time.

(12) Here, the teacher clicks anywhere outside the shared field VO on the screen, thereby stopping selecting an equation VO (610).

(13) Pupil A can select an equation VO (611) with the mouse. This permits Pupil A to select an equation VO from the menu with the mouse and enter a parameter. For example, Pupil A may substitute an initial velocity value into the equation VO (Pupil A's manipulation 1).

(14) Since the above event is sent to an environment of each user as described above, the initial velocity value substituted by Pupil A can be observed by all sharers.

(15) Next, Pupil A moves the equation VO onto a graph VO (612) that (s)he desires to display (Pupil A's manipulation 2). The locus of this movement can also be shared in a manner similar to the foregoing.

(16) As the equation VO (611) is pasted on the graph VO (612), the equation VO disappears, and instead, a result of plotting the equation in a graph is displayed. This display can also be observed in real time by all sharers. Here, Pupil A clicks anywhere outside the shared field VO on the screen, thereby terminating the manipulation on the graph VO.

(17) After the operation described in (12), the teacher can immediately select an equation VO for calculating the position of an object when it is thrown upward vertically (613) in the motion equation folder VO (601) in preparation for the next operation. Since this VO is neither a VO that executes a manipulation scenario directed by Pupil A nor a VO in a parent-child relationship with the VO, it is determined to be an independent VO, so that a mouse click event to this VO is not rejected at the time of event hook (later described) of the shared field VO. Therefore, the teacher can move the equation VO for calculating the position of an object when it is thrown upward vertically from the folder to the outside (teacher's manipulation 4).

FIG. 6 shows how manipulations on these VOs, locus of their movements and so on are shared by the teacher and Pupil A.

(18) Operations by the teacher will be described again below. Here, an example of using a VO which can wrap another application will be described with reference to FIG. 7. On the desktop outside the shared field VO, the teacher drops a presentation application file, in which study of physics is described, onto an application wrapper VO (700) (teacher's manipulation 5). This causes the application to start on the VO, and the application file to open in the VO, so that the contents can be observed. The teacher drops this application wrapper VO on a shared field VO (701) (teacher's manipulation 6).

Figure 7A:
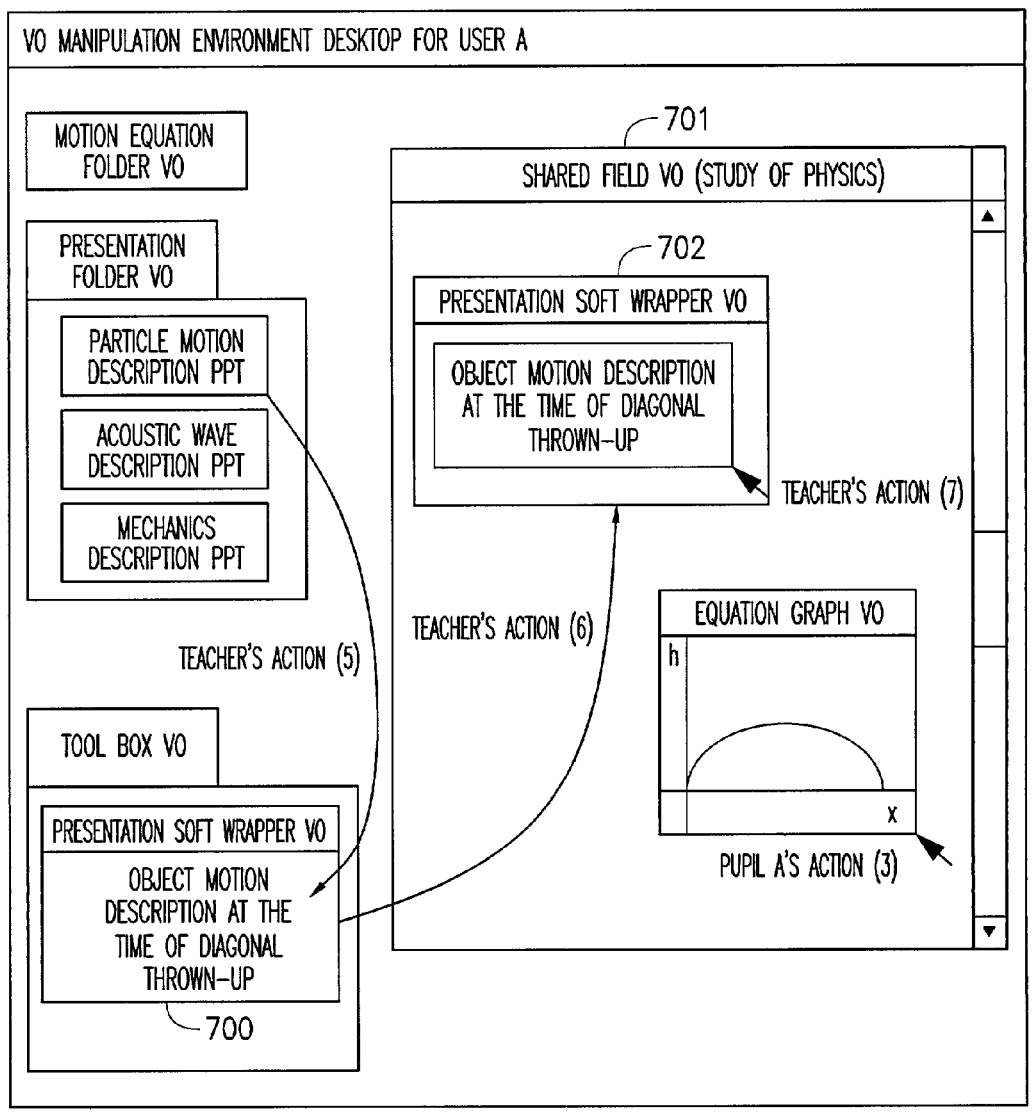

This sequence of manipulations is shown in FIG. 7A.

(19) The shared field VO (701) detects that the new application wrapper VO is pasted thereon, and loads an application wrapper VO (702) into a shared VO database on the server.

(20) The server broadcasts this application wrapper VO to the addresses of sharers who are currently using the system. In this event, a new VO is added on the screens of sharers', and the application wrapper VO appears on the open shared field VO.

(21) With a view to drawing the pupil's attention, the teacher selects a part of a sentence in the description, which is opened in the presentation wrapper VO, and highlights it using the mouse (teacher's manipulation 7). For this teacher's manipulation, a mouse event scenario is also applied to the presentation wrapper VO on the pupil A's shared field VO, and thus, Pupil A can also view the highlighted display.

(22) In this way, the sharers can also read in real time the presentation application file which describes the study of physics.

(23) Similarly, in course of the manipulation described in (21), Pupil A may select an equation graph VO window frame (703) to resize the equation graph VO for viewing the equation graph VO in greater detail (Pupil A's manipulation 3).

Figure 7B:
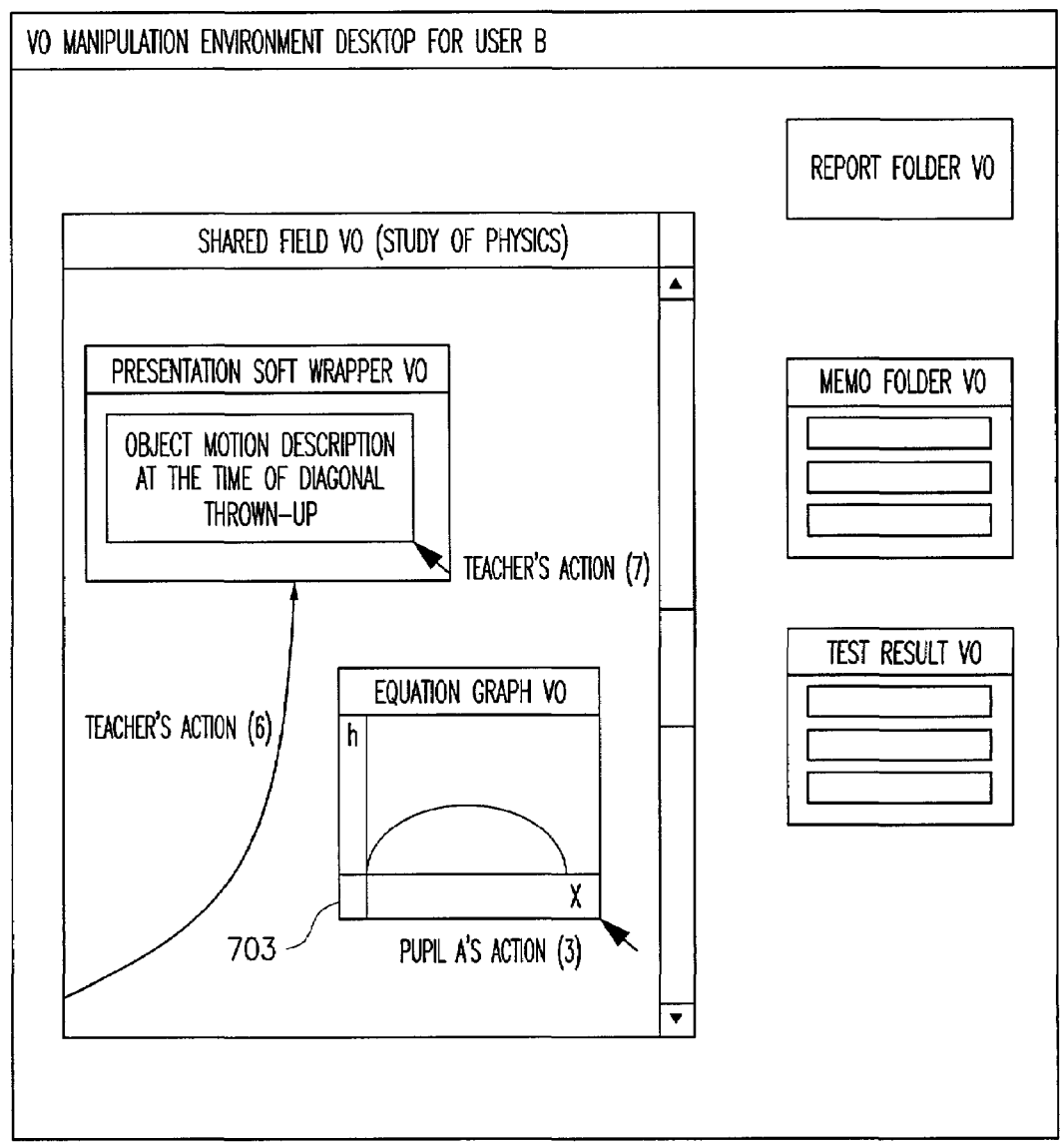

Details on the foregoing manipulation is shown in FIG. 7B.

(24) Now, since Pupil A wants to cancel the participation in the shared field VO, Pupil A clicks the right button of the mouse on the shared field VO to select a participation cancel menu. Responsively, the status of Pupil A is changed to 'suspend' in the associated shared field VO sharer in the shared field VO database on the server.

(25) It is assumed now that there aren't any more sharers but the teacher. The teacher may cancel the sharing in a similar manner to that described above for Pupil A. However, the teacher must store all the most recent states of the shared field VO in the database before termination. With such processing, the next session can be started again from the shared field VO, which reflects the last manipulation of the teacher when the same shared field VO is started next time.

While the foregoing description has been made for the teacher and Pupil A, the same description applies to Pupil B. It goes without saying that the number of participants is not limited to three, but any number of participants can be accepted within the capacity of the system.

Figure 8:
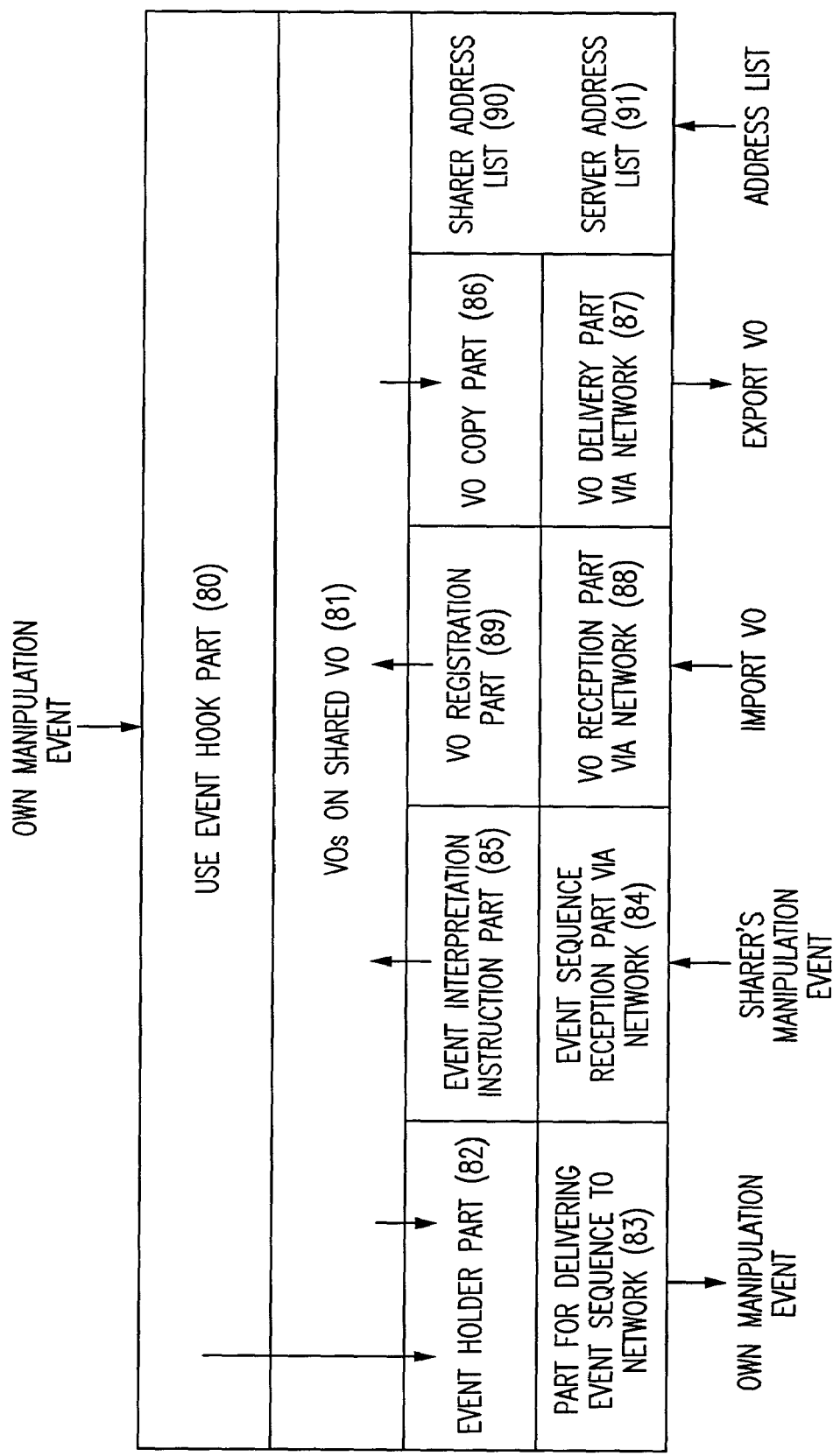
FIG. 8 is a diagram showing an exemplary modular configuration of a shared field VO according to the present invention.

FIG. 8 is a diagram showing an exemplary modular configuration of a shared field VO according to the present invention. In FIG. 8, a user event hook part 80 fetches a user's manipulation event directed to a VO existing on the shared field VO, and delivers it to an event holder part 82. Since the user event hook part is provided in such a manner as to wrap the upper portion of the shared field VO, it can detect a mouse event directed to an arbitrary VO on the shared field VO. In other words, the user event hook part has a function (Before-Daemon) of finding an event to an individual VO immediately before a mouse event is conveyed to the VO on the shared field VO. Given such a structure, any attempt to manipulate an unavailable VO can be detected immediately after the attempt is made and a mouse click is invalidated. A user's manipulation event is also conveyed to VOs 81 on the shared field VO, and intrinsic operations of VOs are performed. Events of the VOs are conveyed to the shared field VO, which is the oldest parent, by the nature inherently possessed by the VOs. Even if an event which cannot be conveyed by a VO itself is generated, the user event hook part has a function (After-Daemon) of recording event information in the shared field VO as a scenario after a mouse event has been actually conveyed to a target VO. The event holder part 82 receives and simultaneously holds operation events of the VOs and events from the user event hook part 80, and sends event information to the server or to other sharing users through an event sequence deliver part 83 connected to a network. Destinations are acquired from a storage (90) storing a server URL list that enumerates URLs to which event information held by the shared field VO is to be delivered and from a storage (91) storing a user address list for accessing shared field VOs of sharers. Event information from the server or the other sharing users is received by an event sequence reception part 84 through the network, interpreted by an event interpretation/instruction part 85, and passed to the VOs on the shared field VO for execution.

When a user who is operating the shared field VO has generated a new VO on the shared field VO, a VO copy part 86 creates a copy of the VO, which is sent by a VO delivery part 87 to the server or to the other sharing users through the network as an export VO. In this case, destinations are also acquired from the storage (90) or (91) which is held by the shared field VO. An import VO from the server or another sharing user is received by a VO reception part 88 through the network and registered on the shared field VO by a VO registration part 89. Given the structure as described above, the shared field VO can provide a sharing environment over a plurality of computers connected to a network or can realize a sharing environment on a server and allow each user to share the sharing environment.

Figure 9:
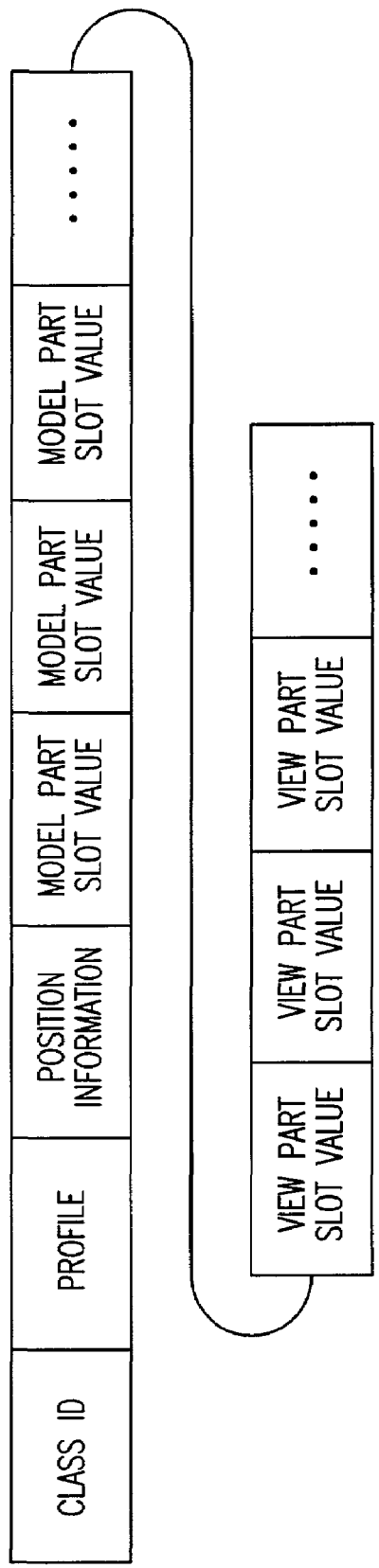
FIG. 9 is a schematic diagram showing the structure of a VO file for a VO according to the present invention.

FIG. 9 is a schematic diagram showing the structure of a VO file for a VO according to the present invention. Each VO has the structure as shown and holds its inherent information. Such inherent information includes ClassID indicative of a class that the VO belongs to, a profile indicative of the name, creator and owner of the VO and description of the VO itself, position information indicative of the coordinates in a shared field VO, slot value as an internal state representing the characteristics possessed by the VO, and so on. By holding the information as listed, each VO ensures the same operation in any VO execution environment on any client machine used by sharers. In other words, an object-oriented instance can be implemented.

Figure 10:
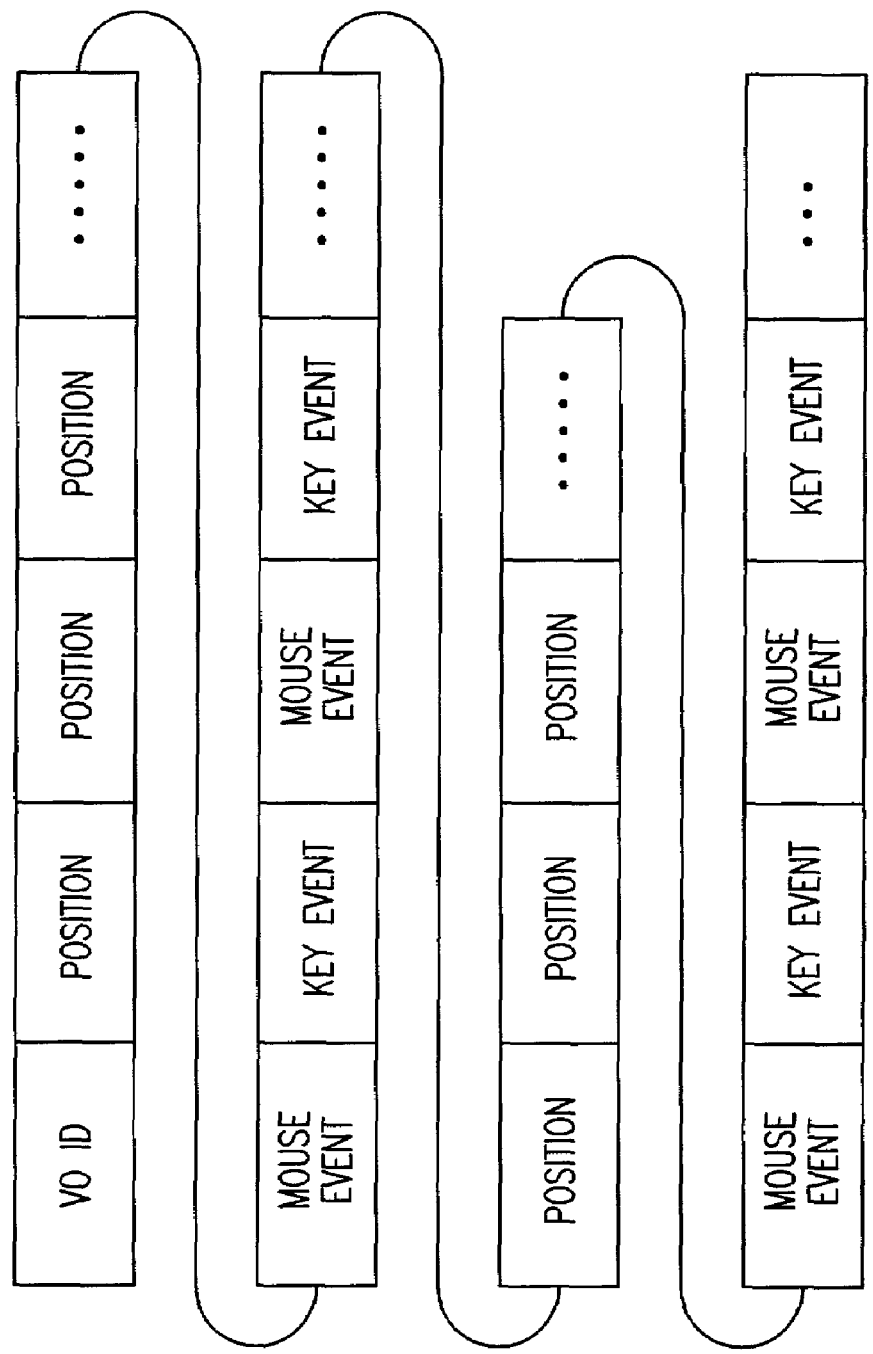
FIG. 10 is a schematic diagram showing a sequence of VO manipulation events according to the present invention.

FIG. 10 is a schematic diagram showing a sequence of VO manipulation events according to the present invention, which is the structure of a scenario for each VO stored in each VO or the shared field VO. In FIG. 10, an initial position of certain VO which has "VO ID" is defined at the head of the sequence. "VO ID" is followed by a mouse event, a key event, a mouse event and a key event as sequentially generated events, information on positions to which VOs have been moved and a variety of events.

By holding a scenario of such a structure and sending this as event information to sharing users by means of the mechanism as shown in FIG. 8, all possible events can be shared and simultaneously observed by the sharing users.

The information sharing method and apparatus configured as described above are implemented to efficiently share any manipulation event.

Therefore, for example, when certain VO on a shared field VO is mouse-clicked on to open a popup menu and start manipulations, it can be known which item on the menu was selected. Also, events involved in selecting, moving and pasting certain object can be viewed by sharing users.

When, for example, an electronic remote on-line learning application is constructed using a sharing function such as described above, a plurality of pupils can precisely understand movements of an object by observing manipulations of an instructor as an operator, which promises a high degree of learning effectiveness.

Further, in consideration of participation of a plurality of users to share the field, midway participation in and midway retirement from a shared region are also realized.

What is claimed is:

1. An information sharing method using an object oriented technology, comprising the steps of:
   providing a plurality of computers connected to a network with an environment in which visual objects operate, each visual object including a model part having a structure called a slot for holding the state of the visual object itself and a view part for exchanging a message with the model part;
   providing a shared field visual object which is operable as an environment of execution of said visual object to be shared and exchanges sharing information of said visual object to be shared with the other shared field visual object;
   registering one or more visual objects to be shared in said shared field visual object as required at any arbitrary time;
   delivering and loading said shared field visual object and said one or more visual objects to be shared, which are registered as required at any arbitrary time, onto said plurality of computers;
   recording, in response to each manipulation made by an operator to said visual object to be shared, event information on said visual object to be shared;
   managing said recorded event information for each visual object to be shared as an object scenario;
   delivering said object scenario to said shared field visual object on said plurality of computers; and
   executing said delivered object scenario for each visual object to be shared associated with said scenario by said shared field visual object on said plurality of computers.

2. The information sharing method using an object oriented technology according to claim 1, wherein:
   each of said recorded one or more visual objects to be shared holds information on its position relative to said shared field visual object.

3. The information sharing method using an object oriented technology according to claim 1, wherein:
   said object scenario is recorded by said shared field visual object.

4. The information sharing method using an object oriented technology according to claim 1, wherein:
   said object scenario is recorded by a visual object to be shared itself which is manipulated by said object scenario.

5. The information sharing method using an object oriented technology according to claim 1, wherein:
   said object scenario includes sequential recording of a change in a relative position of a visual object to be shared with respect to said shared field visual object associated with movements of said visual object to be shared, wherein said relative position is recorded at intervals of adjustable sampling time period.

6. The information sharing method using an object oriented technology according to claim 1, wherein:
   said shared field visual object holds information on users who share said shared field visual object, and information on a server which has user information, wherein a destination of an object scenario is determined based on such shared information.

7. The information sharing method using an object oriented technology according to claim 1, wherein:
   a visual object operating under management of said object scenario cannot be manipulated by individual sharers while an independent visual object not operating under management of said object scenario can be manipulated by the individual sharers.

8. The information sharing method using an object oriented technology according to claim 1, wherein:
   said step of delivering and loading said shared field visual object and said one or more visual objects to be shared, which are registered as required at any arbitrary time, onto said plurality of computers and said step of delivering said object scenario to said shared field visual object on said plurality of computers are directly executed mutually by said plurality of computers.

9. The information sharing method using an object oriented technology according to claim 1, wherein:

said step of delivering and loading said shared field visual object and said one or more visual objects to be shared, which are registered as required at any arbitrary time, onto said plurality of computers and said step of delivering said object scenario to said shared field visual object on said plurality of computers are executed through a server computer on the network.

10. The information sharing method using an object oriented technology according to claim 1, wherein:

said step of delivering and loading said shared field visual object and said one or more visual objects to be shared, which are registered as required at any arbitrary time, onto said plurality of computers is executed through a server computer on the network; and said step of delivering said object scenario to said shared field visual object on said plurality of computers is directly executed mutually by said plurality of computers.

11. A computer readable recording medium having recorded thereon a program which, when executed on a computer, causes the computer to execute a program comprising the steps of:

providing a plurality of computers connected to a network with an environment in which visual objects operate, each visual object including a model part having a structure called a slot for holding the state of the visual object itself and a view part for exchanging a message with the model part;

providing a shared field visual object which is operable as an environment of execution of said visual object to be shared and exchanges sharing information of said visual object to be shared with the other shared field visual object;

registering one or more visual objects to be shared in said shared field visual object as required at any arbitrary time;

delivering and loading said shared field visual object and said one or more visual objects to be shared, which are registered as required at any arbitrary time, onto said plurality of computers;

recording, in response to each manipulation made by an operator to said visual object to be shared, event information on said visual object to be shared;

managing said recorded event information for each visual object as an object to be shared scenario;

delivering said object scenario to said shared field visual object on said plurality of computers; and executing said delivered object scenario for each visual object to be shared associated with said scenario by said shared field visual object on said plurality of computers.

* * * * *